(12) United States Patent
Morita et al.

(10) Patent No.: US 9,896,083 B2
(45) Date of Patent: Feb. 20, 2018

(54) VEHICLE CONTROL DEVICE

(71) Applicant: Nissan Motor Co., Ltd., Yokohama-shi, Kanagawa (JP)

(72) Inventors: Tetsunobu Morita, Kanagawa (JP); Ryoji Kadono, Kanagawa (JP); Shuusaku Katakura, Kanagawa (JP); Kenichiro Murakami, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/911,277

(22) PCT Filed: Jul. 30, 2014

(86) PCT No.: PCT/JP2014/070063
§ 371 (c)(1),
(2) Date: Feb. 10, 2016

(87) PCT Pub. No.: WO2015/033707
PCT Pub. Date: Mar. 12, 2015

(65) Prior Publication Data
US 2016/0185337 A1    Jun. 30, 2016

(30) Foreign Application Priority Data

Sep. 5, 2013 (JP) ................................. 2013-183956

(51) Int. Cl.
*B60W 20/10* (2016.01)
*B60K 6/48* (2007.10)
(Continued)

(52) U.S. Cl.
CPC .............. *B60W 20/10* (2013.01); *B60K 6/48* (2013.01); *B60L 11/14* (2013.01); *B60L 15/20* (2013.01);
(Continued)

(58) Field of Classification Search
CPC ...... B60W 20/10; B60W 10/06; B60W 20/00; B60W 10/08; B60W 2510/0604;
(Continued)

(56) References Cited

U.S. PATENT DOCUMENTS

| 8,370,014 B2 | 2/2013 | Ueno | |
| 2005/0211479 A1* | 9/2005 | Tamor | B60K 6/48 180/65.25 |

(Continued)

FOREIGN PATENT DOCUMENTS

| CN | 101959735 A | 1/2011 |
| JP | 2007-85481 A | 4/2007 |

(Continued)

*Primary Examiner* — Mussa A Shaawat
*Assistant Examiner* — Michael V Kerrigan
(74) *Attorney, Agent, or Firm* — , Global IP Counselors, LLP

(57) ABSTRACT

A vehicle control device includes an engine stop/start determination unit and an engine controller and a re-acceleration scene predicting unit. The engine stop/start determination unit determines stopping and starting of the engine based on a magnitude of the accelerator position opening amount unit. The engine controller carries out the stopping/starting of the engine in accordance with the determination of the engine stop/start determination unit. The re-acceleration scene predicting unit predicts a re-acceleration scene in which an accelerator is depressed after the accelerator has been released based on the accelerator position opening amount. When the re-acceleration scene predicting unit predicts a re-acceleration scene of the engine, the engine stop/start determination unit prohibits the stopping of the engine while the engine is running, and the starting of the engine is carried out by the accelerator being depressed while the engine is stopped.

5 Claims, 7 Drawing Sheets

(51) Int. Cl.
  *B60L 11/14*   (2006.01)
  *B60W 10/06*   (2006.01)
  *B60W 10/08*   (2006.01)
  *B60L 15/20*   (2006.01)
  *B60W 50/00*   (2006.01)
  *B60W 50/06*   (2006.01)
  *B60W 50/08*   (2012.01)
  *B60W 20/19*   (2016.01)
  *B60W 20/00*   (2016.01)
  *B60W 20/20*   (2016.01)

(52) U.S. Cl.
  CPC ............ B60W 10/06 (2013.01); B60W 10/08 (2013.01); B60W 20/19 (2016.01); B60W 50/0097 (2013.01); B60W 50/06 (2013.01); B60W 50/082 (2013.01); B60K 2006/4825 (2013.01); B60L 2240/14 (2013.01); B60L 2240/423 (2013.01); B60L 2240/443 (2013.01); B60L 2250/12 (2013.01); B60L 2250/28 (2013.01); B60L 2260/50 (2013.01); B60W 20/00 (2013.01); B60W 20/20 (2013.01); B60W 2050/002 (2013.01); B60W 2510/0604 (2013.01); B60W 2510/18 (2013.01); B60W 2520/105 (2013.01); B60W 2520/125 (2013.01); B60W 2530/14 (2013.01); B60W 2540/10 (2013.01); B60W 2540/106 (2013.01); B60W 2540/12 (2013.01); B60W 2540/30 (2013.01); B60W 2550/142 (2013.01); B60W 2550/146 (2013.01); *Y02T 10/48* (2013.01); *Y02T 10/6221* (2013.01); *Y02T 10/6252* (2013.01); *Y02T 10/6291* (2013.01); *Y02T 10/645* (2013.01); *Y02T 10/70* (2013.01); *Y02T 10/7077* (2013.01); *Y02T 10/72* (2013.01); *Y02T 10/7275* (2013.01)

(58) Field of Classification Search
  CPC . B60W 2510/18; B60W 2540/10; B60K 6/46; B60K 6/48; B60L 11/14; Y02T 10/84; Y02T 10/6286
  See application file for complete search history.

(56) References Cited

U.S. PATENT DOCUMENTS

2010/0312427 A1* 12/2010 Ueno .................... B60K 6/365
                                                   701/22
2011/0153127 A1    6/2011 Weslati et al.

FOREIGN PATENT DOCUMENTS

| | | |
|---|---|---|
| JP | 2007-232108 A | 9/2007 |
| JP | 2008-168700 | 7/2008 |
| JP | 2009-29386 A | 2/2009 |
| JP | 2009-168700 A | 7/2009 |
| JP | 2009-234565 A | 10/2009 |
| JP | 2010-167961 A | 8/2010 |
| JP | 2012-8664 A | 1/2012 |
| JP | 2012-46148 A | 3/2012 |
| JP | 2012-86640 | 5/2012 |
| WO | 2013/110706 A1 | 8/2013 |

* cited by examiner

VEHICLE CONTROL DEVICE

CROSS-REFERENCE TO RELATED APPLICATIONS

This application is a U.S. National stage application of International Application No. PCT/JP2014/070063, filed Jul. 30, 2014, which claims priority to Japanese Patent Application No. 2013-183956 filed in Japan on Sep. 5, 2013.

BACKGROUND

Field of the Invention

The present invention relates to a vehicle control device which is capable of automatically performing an engine start/stop in response to an accelerator pedal depression operation.

Background Information

Conventionally, as a vehicle control device described above, the vehicle control device disclosed in Japanese Laid-Open Patent Application No. 2008-168700, for example, is known, wherein the control device comprises an engine and a motor, and is used in a hybrid vehicle capable of switching between traveling with only the motor and traveling with both the engine and the motor in accordance with a traveling mode. The conventional device above determines the sports degree such as a normal traveling state in which the traveling state of a vehicle is within a normal range or a sports traveling state in which the traveling state is outside of the normal range, on the basis of a driving operation by a driver and the traveling environment of the traveling path, and changes the boundary between an electric vehicle (EV) traveling mode region in which only a motor drives the vehicle and a hybrid vehicle (HEV) traveling mode region in which a motor and an engine drive the vehicle, from an original position according to the normal traveling state to the electric traveling mode region side to expand the hybrid traveling mode region, when the determination result is a sports traveling state.

SUMMARY

However, the above-described conventional vehicle control device has the following problems. That is, the above-described conventional vehicle control device infers a re-acceleration scene (scene) in which a re-acceleration is required by detecting a rapid accelerator-off, sudden braking, or a curve greater than a predetermined curvature, while determining the above-described sports degree based on a driving tendency index, which is a weighted calculation of acceleration/deceleration in the longitudinal direction and the curvature of the traveling path. Calculations of the sports degree other than the above-described prior art are disclosed in Japanese Laid Open Patent Application No. 2012-46148, Japanese Laid Open Patent Application No. 2012-86640, etc.

The device is configured so that traveling will be performed in the HEV traveling mode, when the sports degree becomes greater than a predetermined threshold and a re-acceleration scene which requires a re-acceleration response is inferred. Accordingly, there are times when the engine starts without requests from the driver or a vehicle side system (for example, a charging request when the charge rate of the battery drops, for supplementing negative pressure when the negative pressure of the brakes decreases, and for compensating for a decrease in the drive force due to the air conditioner, etc.) when the inferred value of the sports degree fluctuates according to the driving state/traveling state, and a re-acceleration scene is assumed and a transition to the HEV traveling mode is performed while traveling in EV traveling mode. In this case, there is the problem of imparting alarm to the driver, since the engine will be started in an unexpected situation.

This problem will be described more specifically below. FIG. 8 illustrates an example of a problem when the sports degree is determined based on the braking deceleration which is an acceleration/deceleration in the longitudinal direction of the vehicle, in the above-described prior art. In the same figure, (a) represents the temporal variation of accelerator position opening amount, (b) represents the temporal variation of the braking deceleration, (c) represents the temporal variation of the acceleration/deceleration in the longitudinal direction of the vehicle, (d) represents the temporal variation of the vehicle speed, (e) represents the temporal variation of the sports degree, and (f) represents the temporal variation of the switching between the EV traveling mode and the HEV traveling mode.

In the above example, a situation is described in which the driver first steps on the accelerator pedal enough to engage the HEV traveling mode in a straight state, but the acceleration/deceleration in the longitudinal direction of the vehicle has not become so great (therefore, the sports degree is smaller than the sports determination threshold), and then rapidly releases the accelerator pedal, moves a foot and steps on the brake pedal until the vehicle stops. When the accelerator pedal is rapidly released, a re-acceleration scene is predicted, and the absolute value of the deceleration in the longitudinal direction increases due to an engine brake, as illustrated in part (c) of FIG. 8, and the vehicle starts to decelerate, as illustrated in part (d) of FIG. 8. In this case, with this magnitude of deceleration, the sports degree does not surpass the threshold.

The driver will step on the brake pedal after releasing the accelerator pedal, but a time lag will occur, amounting to the length of time for the pedal retreating motion and the brake pedal stepping motion, before the brake actually starts to be effective. Once the brake starts to be effective, due to an application of brake torque by a wheel side brake unit in addition to the engine brake, the absolute value of the deceleration in the longitudinal direction further increases and the sports degree surpasses the sports determination threshold. However, this moment will be later than the brake pedal operation, as described above. By this actuation of the brake, the vehicle speed will further decrease rapidly, and when the vehicle speed becomes 0, the driver will decrease the stepping force on the brake pedal and maintain the vehicle in a stopped state.

In the case of the traveling example described above, a vehicle travels in the HEV traveling mode if the accelerator position opening amount is greater than a predetermined value even if the sports degree is smaller than the sports determination threshold, but rapidly returning the accelerator position opening amount to 0 causes the vehicle to switch to the EV traveling mode, and the hitherto running engine is stopped, as illustrated in part (e) of FIG. 8. However, if the brake pedal is then operated and the brake torque is actually applied to the vehicle and the absolute value of the deceleration of the vehicle further increases, and the sports degree calculated based on the deceleration surpasses the sports determination threshold, since a re-acceleration scene is predicted as described above, an instruction to switch from the EV traveling mode to the HEV traveling mode is issued, and the engine will start in a range where running is intrinsically unnecessary, as illustrated in part (f) of FIG. 8.

Then, when the vehicle stops, the brake pedal is returned, the absolute value of the deceleration in the longitudinal direction decreases, and the sports degree falls below the sports determination threshold, the vehicle switches from the HEV traveling mode to the EV traveling mode and the engine stops. In this manner, if the engine starts/stops without a system request or when not intended by the driver, alarm is imparted to the driver. In FIG. 8, the dotted line represents the accelerator pedal depression (the peak to the left of the figure) and the brake pedal depression (the peak to the right of the figure), and the trough portion between the two peaks represents the retreating of the pedal. The sports degree is determined based on the actual acceleration/deceleration in the longitudinal direction, so the determination is slightly delayed from the above-described pedal depressions and releases.

In addition, as another example of a problem, there is a case in which an unnecessary starting/stopping of the engine occurs despite hill-climbing being possible in the EV traveling mode, as illustrated in FIG. 9. In FIG. 9, (a) represents the elevation of the road, (b) represents the inferred gradient of the road, and (c) represents the temporal variation of the switching between the EV traveling mode and the HEV traveling mode. In this example, the traveling path is a road which first has an ascending gradient and then becomes a flat road, as illustrated in part (a) of FIG. 9, and the control device on the vehicle side infers the gradient of the road from, for example, the accelerator position opening amount and the acceleration in the longitudinal direction of the vehicle, the road information from a car navigation system, or from a tilt sensor, and compares the inferred value and the gradient determining threshold, as illustrated in part (b) of FIG. 9. There is also a time-lag between this inference of the gradient and the actual gradient. Therefore, in the case of traveling in the EV traveling mode and a switching to the HEV traveling mode is determined to be required, there is a time-lag between the actual points in times that the gradient begins and ends, and the inferred times thereof, as illustrated in the same figure. In this case as well, alarm is imparted to the driver by the traveling mode switching from the EV traveling mode to the HEV traveling mode, and then to the EV traveling mode, and thereby causing the engine to start/stop when it is unnecessary and when not intended by the driver.

In view of the problems described above, an object of the present invention is to provide a vehicle control device that can avoid imparting alarm to the driver by the engine starting without a request from the driver or a system request mentioned above, in a vehicle which is capable of starting/stopping the engine in response to the accelerator pedal opening amount.

For this purpose, a vehicle control device according to the present invention comprises an engine stop/start determination means which determines the stopping and starting of the engine based on the accelerator position opening amount, and a re-acceleration scene predicting means which predicts a re-acceleration scene in which an accelerator-on is performed after an accelerator-off, based on the accelerator position opening amount, etc., wherein, when the re-acceleration scene predicting means predicts a re-acceleration scene of the engine, the engine stop/start determination means prohibits the stopping of the engine while the engine is running, and an engine control means starts the engine based on an accelerator-on while the engine is stopped.

According to the vehicle control device of the present invention, imparting alarm to the driver due to a starting of the engine other than by a request of the driver or a system request can be suppressed.

BRIEF DESCRIPTION OF THE DRAWINGS

Referring now to the attached drawings which form a part of this original disclosure.

DETAILED DESCRIPTION OF THE EMBODIMENTS

Embodiments of the present invention will be explained below based on the embodiment illustrated in the diagrams.

First Embodiment

Figure 1:
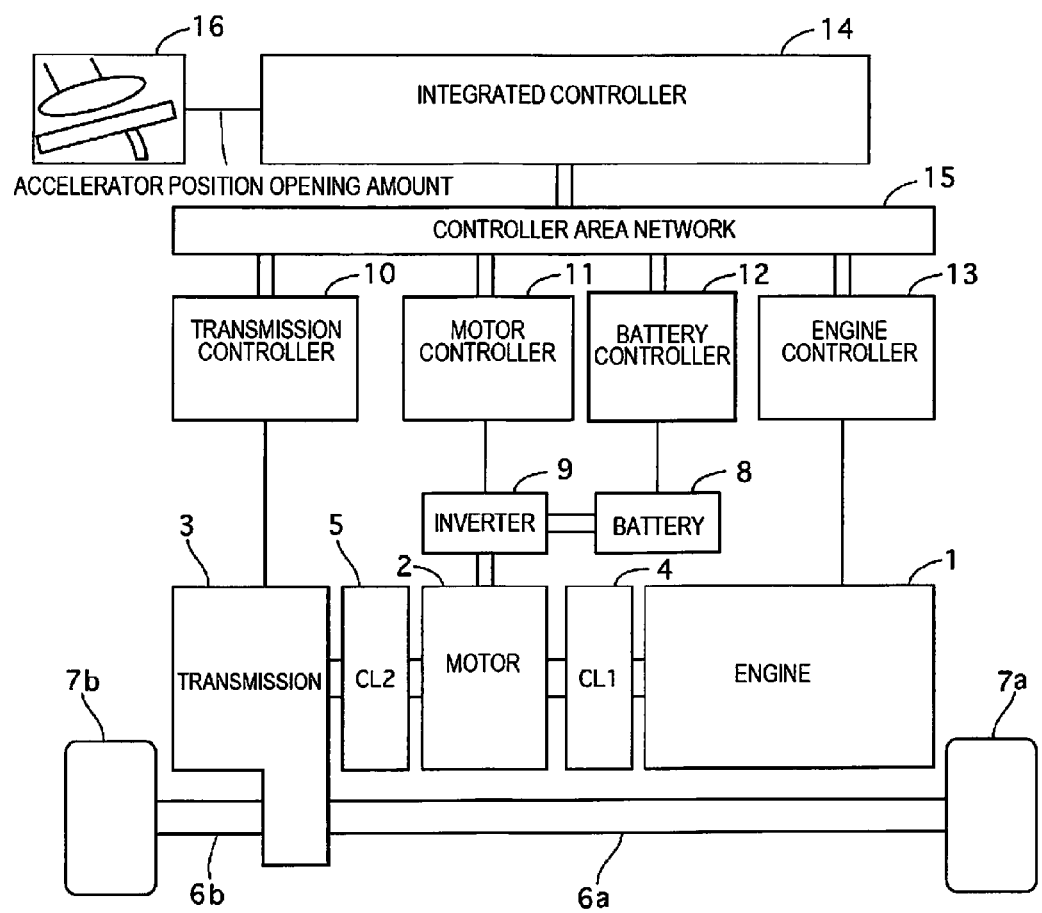
FIG. 1 is a view schematically illustrating a control device and a power train thereof of a hybrid vehicle according to a first embodiment of the present invention.

The first embodiment of a vehicle control device is mounted on a hybrid vehicle. FIG. 1 schematically illustrates a vehicle control device and a power train thereof according to the first embodiment. The hybrid vehicle comprises an engine 1, a motor 2, a transmission 3, a first clutch (CL1) 4, a second clutch (CL2) 5, left and right accelerator shafts 6a and 6b, left and right driving wheels 7a and 7b, and a power train, as illustrated in the drawing.

The hybrid controller further comprises a battery 8, an inverter 9, a transmission controller 10, a motor controller 11, a battery controller 12, an engine controller 13, an integrated controller 14, a control area network (CAN) 15, and an accelerator position opening amount sensor 16.

Each of the above-described constituent components is described below. The engine 1 is an internal combustion engine, which burns gasoline or the like for fuel, and generates driving force. The motor 2 generates driving force via an inverter 9 under the control thereof receiving a supply of electric power from the battery 8. In addition, the motor functions as a generator during vehicle braking and is capable of regeneration, changing part of the braking energy into electric power. That is, the motor 2 functions as a motor/generator, and, for example, uses a three-phase AC motor.

In the present embodiment, the transmission 3 comprises a primary pulley, a secondary pulley which is arranged in parallel thereto, and a metallic V-belt for transmitting power by being bridged between the two pulleys, and is configured by a belt type continuously variable transmission for carrying out a continuously variable shifting by changing the groove widths of these two pulleys.

An input shaft of the primary pulley is connected to the second clutch 5, and an output shaft of the secondary pulley is connected to a forward-reverse switching planetary gear set which is not shown, and is connected to the left and right accelerator shafts 5a and 5b via a differential gear set which is not shown.

A different type of continuously variable transmission or a multi-speed automatic transmission, etc., instead of the above-described belt type continuously variable transmission, may be used to configure the transmission 3.

The first clutch 4 is disposed between the engine 1 and the electric motor 2, and is able to connect and disconnect between the engine 1 and the electric motor 2 using an integrated controller 14, while not shown. The second clutch 5 is disposed between the electric motor 2 and the transmission 3, and is able to connect and disconnect between the electric motor 2 and the transmission 3 using the integrated controller 14, while not shown. Here, for the first clutch 4 and the second clutch 5, for example, a hydraulically actuated multi-plate type clutch is used, so as to be able to variably control the transmission torque capacity thereof continuously by controlling the clutch pressure. The accelerator shafts 5a and 5b connect a differential gear apparatus of the transmission 3 and the driving wheels 7a and 7b respectively with joints, which are not shown.

The battery 8 is a secondary battery capable of repeatedly charging and discharging, and, for example, a lithium ion battery is used.

The inverter 9 converts the DC current of the battery 8 into a three-phase AC current of a necessary magnitude in response to a control signal from the motor controller 11 to supply to the motor 2.

Conversely, during regeneration, the three-phase AC current generated by the motor 2 is converted into a DC current to charge the battery 8 and the like.

The transmission controller 10 controls the hydraulic pressure to be supplied to the pulley so as to obtain an optimal transmission ratio in accordance with the driving situation such as the accelerator position opening amount of the accelerator pedal and the input shaft rotational speed, and the traveling situation such as the vehicle speed. The motor controller 11 sends driving control signals, regeneration control signals, and the like to the inverter 9 to perform a control thereof.

The battery controller 12 manages the temperature of each cell which configures the battery 8, and infers the state of the battery 8, such as the state of charge (SoC) and the maximum battery output limit value that can be outputted. The engine controller 13 performs the ignition control, fuel supply amount control, and the like, of the engine 1, to perform stop, start, and optimal running (when the engine rotational speed is not 0), and the like, of the engine. The engine controller 13 corresponds to the engine control means of the present invention.

The integrated controller 14 is connected to the transmission controller 10, the motor controller 11, the battery controller 12, and the engine controller 13 by the CAN 15, carries out signal transmission and reception therewith, and controls these controllers so that the controls performed by the controllers 10-13 in cooperation with each other become an optimal control as a whole. The integrated controller 14 is connected to the accelerator position opening amount sensor 16 which detects the accelerator position opening amount corresponding to the operation amount of the accelerator pedal, but is also connected to various other sensors, while not shown, so that necessary information can be obtained.

Figure 2:
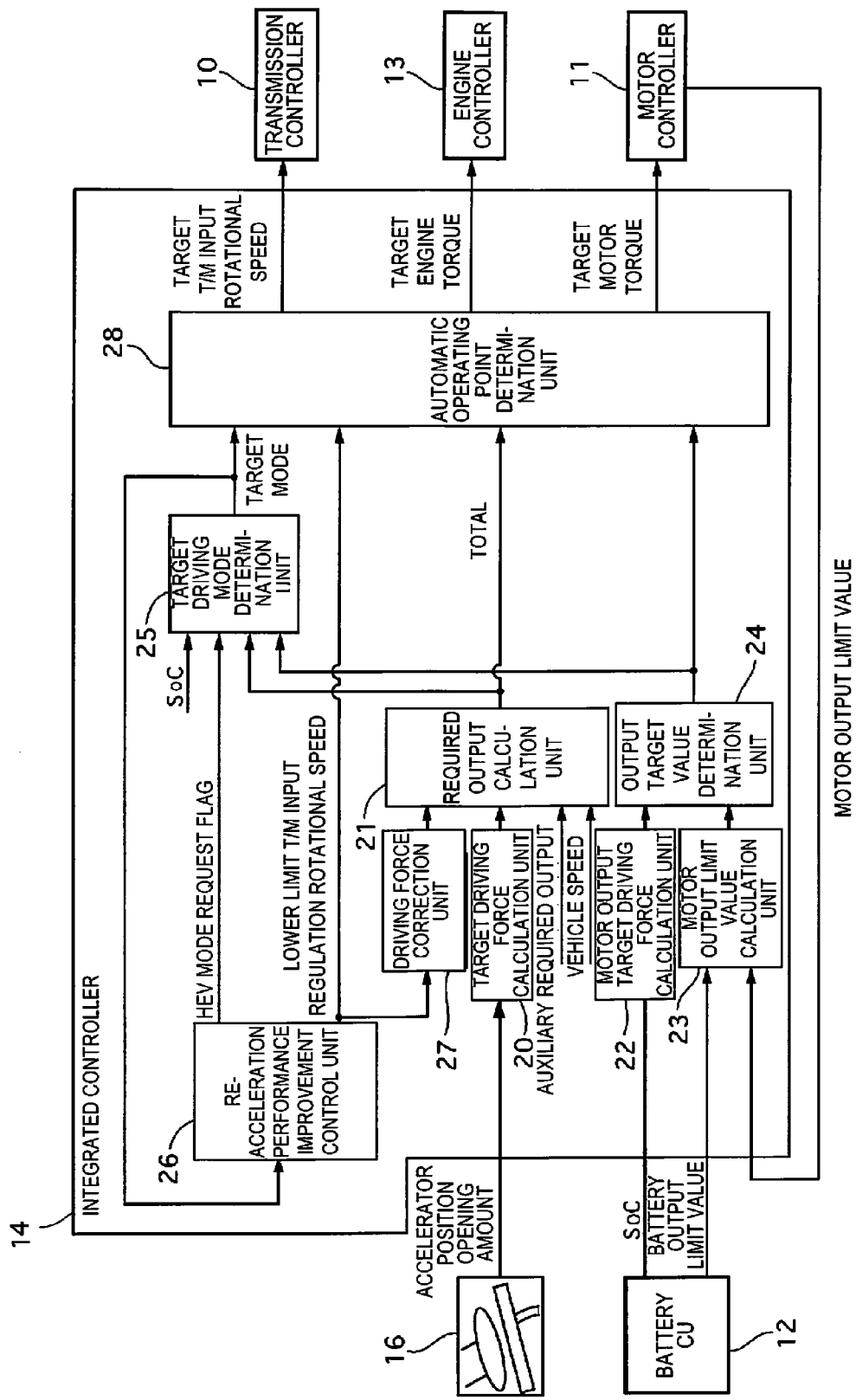
FIG. 2 is a functional block view illustrating the configuration of the hybrid vehicle control device of the first embodiment.

Next, a functional block diagram representing the necessary parts for the present invention of the integrated controller 14 above is illustrated in FIG. 2. The integrated controller 14 comprises a target driving force calculation unit 20, a required output calculation unit 21, a motor output target value generation unit 22, a motor output limit value calculation unit 23, an output target value determination unit 24, a target driving mode determination unit 25, a re-acceleration performance improvement control unit 26, a driving force correction unit 27, and a target operating point determination unit 28.

Each of the above components will be described below. An accelerator position opening amount signal detected by the accelerator position opening amount sensor 16 is inputted to the target driving force calculation unit 20, which outputs a target driving force signal that corresponds to the inputted accelerator position opening amount signal by referencing a target driving force map which stores the relationship between the accelerator position opening amount and the target driving force, to the required output calculation unit 21.

The required output calculation unit 21 calculates all outputs required by the vehicle based on the target driving force signal inputted from the target driving force calculation unit 20, the driving force correction signal inputted from the driving force correction unit 27, the required output signal inputted from auxiliary machines such as an air conditioner, and the vehicle speed signal inputted from the vehicle speed sensor, which is not shown, and outputs the signals as a total output signal to the target operating point determination unit 28 and the target driving mode determination unit 25.

The motor output target value generation unit 22 determines a motor output target value which corresponds to the detected charge rate by referencing a motor output target map that stores the relationship between the charge rate and the motor output target value based on the charge rate signal inputted from the battery controller 12, and outputs the value as a motor output target value signal to the output target value determination unit 24.

The motor output limit value calculation unit 23 calculates the motor output limit value based on the battery output limit value signal inputted from the battery controller 12 and the motor output limit value signal inputted from the motor controller 11 and outputs the value as a motor output limit value signal to the output target value determination unit 24. Here, the motor output limit value calculation unit 23 sets a motor output upper limit value and a motor output lower limit value as motor output limit values, and compares a battery output possible upper limit value and a motor output upper limit value to choose the smaller for the former, and compares the battery output possible lower limit value and the motor output lower limit value to choose the larger for the latter, so that the battery 8 does not become overcharged or over-discharged.

The output target value determination unit 24 carries out an upper limit step and a lower limit step with the motor output limit value inputted from the motor output limit value calculation unit 23 with respect to the motor output target value inputted from the motor output target value generation unit 22 and outputs the value as the output target value signal of the motor 2 to the target operating point determination unit 28 and the target driving mode determination unit 25.

The target driving mode determination unit 25 determines the target mode of either the EV traveling mode or the HEV traveling mode based on the charge rate signal inputted from the battery controller 12, the HEV mode request flag signal inputted from the re-acceleration performance improvement control unit 26, the total output signal inputted from the required output calculation unit 21, and the output target value signal inputted from the output target value determination unit 24, referencing the target driving mode map which stores relationship between the values and target driving modes thereof, determines a target mode from either the EV traveling mode or the HEV traveling mode, and outputs the determination as a target mode signal to the target operating point determination unit 28 and the re-acceleration performance improvement control unit 26.

Here, the target driving mode determination unit 25 determines the corresponding driving mode (EV traveling mode or HEV traveling mode) in accordance with the accelerator position opening amount corresponding to the request load of the driver, and the vehicle speed which is proportional to the output rotational speed of the transmission 3, using the driving mode map. However, if an HEV traveling mode request flag is inputted from the re-acceleration performance improvement control unit 26, the EV traveling mode is prohibited and the HEV traveling mode is selected. The target driving mode determination unit 25 corresponds to the engine stop/start determination means of the present invention.

The re-acceleration performance improvement control unit 26 is inputted a target mode signal from the target driving mode determination unit 25, an accelerator position opening amount signal from an accelerator position opening amount sensor, a brake operation signal from a brake pedal operation sensor, which is not shown, a curve signal calculated based on the wheel speed from a wheel sensor, which is not shown, and the acceleration/deceleration in the longitudinal direction of the vehicle from an acceleration sensor, which is not shown, respectively, and calculates the sports degree based on the acceleration/deceleration in the longitudinal direction of the vehicle, and the curvature of the traveling path, and the like, and compares the value with the sports determination threshold to determine whether or not the traveling is sports traveling, while predicting the presence/absence of a re-acceleration scene in which a re-acceleration is necessary by detecting a rapid accelerator-off, sudden braking, curve detection, and the like, and outputs an HEV traveling mode request flag signal of re-acceleration performance improvement control unit 26 and a lower limit transmission (T/M) input regulation rotational speed signal to the target driving mode determination unit 25 and the target operating point determination unit 28, respectively. The controls executed by the re-acceleration performance improvement control unit 26 will be described later. Additionally, the re-acceleration performance improvement control unit 26 corresponds to the re-acceleration scene predicting means or the re-acceleration scene predicting unit of the present invention.

The driving force correction unit 27 receives a lower limit transmission input regulation rotational speed signal from the re-acceleration performance improvement control unit 26, and outputs a driving force correction signal to the required output calculation unit 21, for obtaining the driving force required so that the input rotational speed of the transmission 3 does not fall below the lower limit value during driving, such as rapid accelerator-off, sudden braking, and curve traveling. For the lower limit transmission input regulation rotational speed, the driving force correction of the vehicle speed and the rotational speed regulation is executed in both the EV traveling mode and the HEV traveling mode.

The target operating point determination unit 28 determines the target operating points of the engine 1, the motor 2, and the transmission 3, respectively, based on the total output signal inputted from the required output calculation unit 21, the output target value signal inputted from the output target value determination unit 24, the target mode signal inputted from the target driving mode determination unit 25, and the lower limit transmission input regulation rotational speed signal inputted from the re-acceleration performance improvement control unit 27, referencing the target operating point map which stores the relationship between the control content of the engine 1, the motor 2, the transmission 3, and the respective inputted values, and outputs a target operating point signal corresponding to the engine controller 13, the motor controller 11, and the transmission controller 10, respectively.

That is, at the target operating point determination unit 28, a transient target engine torque signal, a target motor torque signal (or a target generator torque signal), a target transmission input rotational speed signal, a target first clutch transmission torque capacity signal, and a target second clutch transmission torque capacity signal are outputted to the engine 1, the motor 2, the transmission 3, the first clutch 4, and the second clutch 5, respectively, with the accelerator position opening amount, the total output (the target drive torque of the engine 1 and the target torque of the motor 2), the driving mode and the vehicle speed as the arrival targets of the operating point. The drawings of the signals above are partially omitted in FIG. 2.

Next, the actions of the vehicle of the first embodiment having the configuration described above will be described below. Here, the actions will be described with focus on only the actions related to the present invention, since the control of the power train of a hybrid vehicle is well known.

First, the control when a re-acceleration scene of the vehicle is inferred will be described, based on each of the flowcharts of FIG. 3-FIG. 5. The re-acceleration scenes here are respectively predicted by calculating the medium- to long-term traveling environment/driving tendency, and the short-term driving operations. Each case will be described in order, below.

Figure 3:
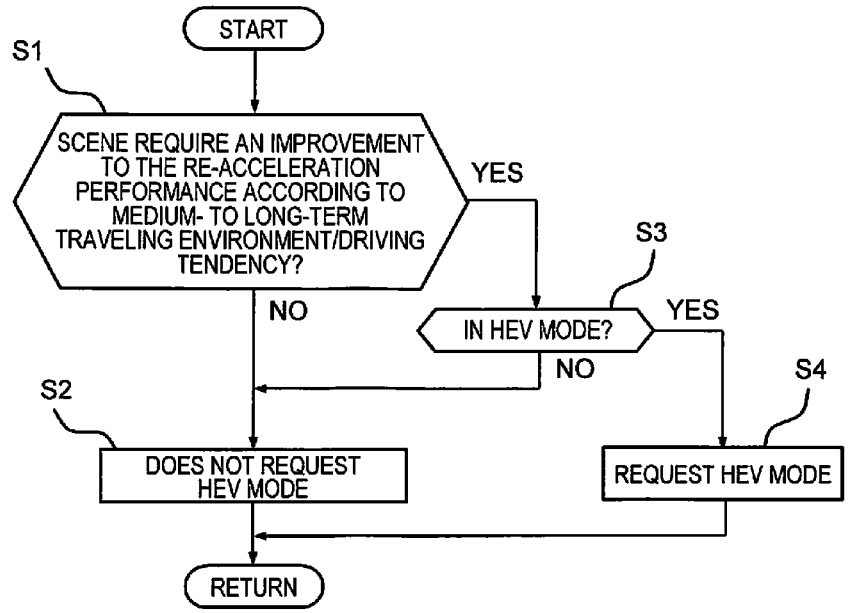
FIG. 3 is a flowchart of the switching control between the EV mode and HEV mode performed based on the prediction of a re-acceleration scene during an engine stop executed in the hybrid vehicle control device of the first embodiment.

First, FIG. 3 shows a flowchart of a case in which it is determined whether or not the situation is a re-acceleration scene which requires an improvement of the re-acceleration performance according to the medium- to long-term traveling environment/driving tendency, and a control is carried out. Here, a re-acceleration scene is predicted if one of the following conditions are met: the presence/absence of an uphill which has a climbing gradient, as a medium- to long-term traveling environment; or the presence/absence of an operation in a re-acceleration scene in which an accelerator-on is carried out after an accelerator-off, as a medium- to long-term driving tendency. In FIG. 3, whether or not a situation that requires an improvement in the re-acceleration performance has been predicted by the re-acceleration performance improvement control unit 26 based on the medium- to long-term traveling environment/driving tendency is determined in step S1. That is, whether or not a climbing gradient greater than a predetermined amount which causes the prediction of a re-acceleration scene, or the accelerator operation mentioned above which causes the prediction of a re-acceleration scene has been detected, is determined. If the determination result is YES, the process proceeds to step S3, and if NO, the process proceeds to step S2.

The detection of the gradient of the hill-climbing road is carried out as follows. That is, the road gradient is calculated by carrying out a filtering step of the gradient, by calculating the power transmission friction, the travel resistance, and the acceleration resistance, and subtracting the travel resistance and acceleration resistance when traveling a flat road from the driving force. Here, the drifting of the calculated value is prevented by carrying out the filtering step, thereby satisfying the required responsiveness. When using a gradient angle sensor, a filtering step of the detected value can be carried out. Whether or not a scene requires an improvement of the re-acceleration performance is determined by comparing the gradient degree calculated in this manner with a threshold value.

In step S2, since the scene is determined not to require an improvement of the re-acceleration performance in step S1, as a result of the gradient degree being below the threshold, and an accelerator operation which causes the prediction of the re-acceleration scene mentioned above not being detected, the re-acceleration performance improvement control unit 26 does not request the HEV traveling mode. That is, the HEV traveling mode request flag signal is not outputted. Subsequently, the process returns to step S1.

On the other hand, in step S3, since at least one of either the climbing gradient mentioned above or the accelerator operation mentioned above has been detected, and the scene has been determined to require an improvement in the re-acceleration performance in step S1, whether or not the target mode signal currently being outputted from the target driving mode determination unit 25 is the HEV mode is determined. If the determination result is YES, the process proceeds to step S4, and if NO, the process proceeds to step S2.

In step S4, since the current traveling is by the HEV traveling mode, an HEV traveling mode request flag signal for requesting the HEV traveling mode is outputted, so that the target driving mode determination unit 25 outputs the HEV traveling mode as the target mode. Subsequently, the process returns to step S1.

In the above-described control, the re-acceleration performance improvement control unit 26 has been configured to not request the starting of the engine 1 (that is, to not enter HEV traveling mode), when a re-acceleration scene has been predicted while the engine 1 is stopped (that is, during traveling in the EV traveling mode). Therefore, the engine will only be started in the case of a driver request or a system request; therefore, in other cases, the engine starting and imparting alarm to the driver will be prevented. In addition, once the engine 1 is stopped, even if the prediction of a re-acceleration scene causes a hunting between the stopping and the starting of the engine 1, since the engine 1 will not start unless there is a driver request or a system request, alarm is not imparted to the driver.

In addition, in the case that a re-acceleration scene is predicted due to a detection of a climbing gradient while traveling in the HEV traveling mode, the re-acceleration performance improvement control unit 26 outputs an HEV traveling mode request flag to the target driving mode determination unit 25. Furthermore, a transmission minimum rotational speed is derived from a map, using the calculated gradient degree and the vehicle speed inputted from a vehicle speed sensor, which is not shown, which is reflected to the changing of the driving force (regardless of during stopped or running of the engine 1) and to the target rotational speed (the changing of rotational speed is carried out only when the engine is running) when in the HEV traveling mode.

When traveling a climbing gradient, since a larger load is applied to the vehicle than when traveling a flat road, the requested driving force must be increased in order to maintain or accelerate the vehicle speed. Therefore, when traveling this climbing gradient, the engine 1 will often be running, and thus the stopping of the engine 1 due to a prediction of a re-acceleration scene can be prohibited. On the other hand, when traveling a climbing gradient in the EV traveling mode, in which the engine is stopped, the vehicle is often decelerating. An acceleration operation does not necessarily occur thereafter, so starting the engine 1 without a driver request or a system request has a large disadvantage of alarm for the driver. However, if acceleration or maintaining of the vehicle speed is attempted on a climbing gradient, once the engine 1 is started by depressing the accelerator pedal at some point the running can be maintained, and therefore the re-acceleration performance is improved. In addition, by changing the target driving force in accordance with the gradient degree and calculating the gradient degree while the engine 1 is stopped, the starting of the engine 1 by an accelerator request can be carried out with a smaller accelerator position opening amount than normal.

Furthermore, while not described in FIG. 3, if the re-acceleration performance (re-acceleration response) is desired to be improved, the changing of the driving force can be configured to be carried out regardless of the engine being stopped or running, in accordance with the magnitude of the calculated sports degree. The engine thereby becomes easier to start even while the engine is stopped, and changing of the rotational speed is also carried out (however, only carried out when the engine is running). The sports degree can be obtained by, for example: carrying out an indexation by calculating the resultant acceleration from the acceleration in the longitudinal direction and the acceleration in the lateral direction of the vehicle (an acceleration detection by an acceleration sensor or a calculation based on the vehicle speed from a vehicle speed sensor, or the like), and then dividing the resultant acceleration by a reference value; or carrying out an integration step of the resultant acceleration (including filtering steps and averaging steps), or the like. A situation which requires an improvement of the re-acceleration response is detected by comparing the above values and a threshold value. For the value to perform the above integration step, a jerk (jolt) can be used, as well as the accelerator position opening amount, the brake operating amount, or the steering angle, which are related to the acceleration of the vehicle.

In this case as well, the same controls as steps S2-S4 of FIG. 3 are carried out. When an improvement of the re-acceleration response is required while traveling in the HEV traveling mode, the re-acceleration performance improvement control unit 26 outputs an HEV traveling mode request flag to the target driving mode determination unit 25. In addition, the transmission minimum rotational speed is derived from the map using the sports degree and the vehicle speed, which is reflected on the changing of the driving force and the target rotational speed in the HEV traveling mode, in the same way as above.

For another prediction of a re-acceleration scene, a scene requiring a re-acceleration scene can be detected by performing an integration step (including filtering steps and averaging steps) of the acceleration applied to the vehicle, including, at least, the vehicle longitudinal acceleration, and comparing the result with a threshold value. Here, when accelerating/decelerating, acceleration occurs mainly at the time of accelerator-on, deceleration occurs mainly at the time of a brake operation, and lateral acceleration occurs mainly at the time of a steering wheel operation. When the inferred value of the sports degree becomes the threshold value or greater due to acceleration, it is often the case that the sports traveling is due to mainly accelerator operations. In this case, since traveling is often done with the engine 1 running, the stopping of the engine 1 can be prohibited by predicting a re-acceleration scene.

On the other hand, when the sports degree becomes the threshold value or greater due to deceleration or lateral acceleration, whether or not the driver will perform an accelerating operation afterwards is unclear, even if the engine 1 is running. Therefore, in this case, the starting of the engine 1 without a request from the driver has the large disadvantage of alarm for the driver. However, if performing sports traveling, there is a large possibility that the accelerator pedal will be depressed at some point, and once the engine 1 is started, the running will be maintained thereafter, and therefore the re-acceleration response can be improved.

Figure 4:
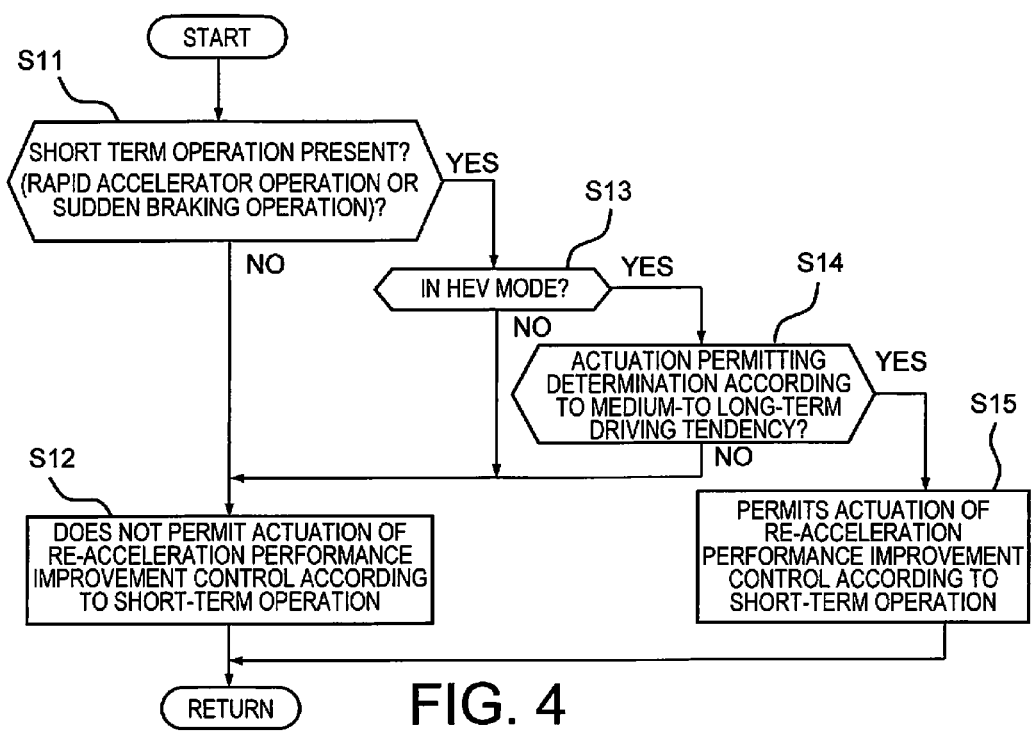
FIG. 4 is a flowchart of the switching control between the EV mode and HEV mode performed based on the prediction of a re-acceleration scene during an engine stop executed in the hybrid vehicle control device of the first embodiment.

Next, FIG. 4 illustrates a flowchart of the control when a short-term operation is present.

In step S11 of FIG. 4, the re-acceleration performance improvement control unit 26 determines whether or not a short-term operation such as a rapid accelerator-off operation or a sudden braking operation was present, based on the accelerator position opening amount signal inputted from the accelerator position opening amount sensor 16 and the brake operation amount signal inputted from the brake pedal operation sensor, which is not shown.

If the determination result is YES, the process proceeds to step S13, and if NO, the process proceeds to step S12.

In step S12, the actuation of the re-acceleration response improvement control according to a short-term operation is not permitted, that is, when the engine 1 is stopped, the engine will not be started. Subsequently, the process returns to step S11.

In step S13, the re-acceleration performance improvement control unit 26 determines whether or not the target mode outputted from the target driving mode determination unit 25 is currently the HEV traveling mode. If the determination result is YES, the process proceeds to step S14, and if NO, the process proceeds to step S12.

In step S14, whether or not an actuation permission according to the above-described medium- to long-term driving tendency is present is determined. If the determination result is YES, the process proceeds to step S15, and if NO, the process proceeds to step S12.

In step S15, a re-acceleration improvement control according to a short-term operation permits an actuation. That is, the re-acceleration performance improvement control unit 26 outputs an HEV traveling mode request flag signal to the target driving mode determination unit 25, and requests the HEV traveling mode. In addition, the transmission minimum rotational speed is derived from the map using the sports degree and the vehicle speed, and is reflected on the changing of the driving force and the target rotational speed in the HEV traveling mode. Subsequently, the process returns to step S11.

In the above-described control, that the engine 1 is running is one of the control conditions. Accordingly, the engine 1 starting without a driver request or a system request is prevented. Additionally, even with these conditions, since the engine 1 will be running most of the time when a re-acceleration scene is predicted, there is no problem. Additionally, since the control is actuated on the condition that the engine 1 is running, even if the engine 1 is run according to a system request after a rapid accelerator-off or a sudden braking operation, the control to improve the re-acceleration according to a rapid accelerator-off or a sudden braking operation will not be actuated, and therefore alarm will not be imparted to the driver. Even in cases in which a re-acceleration scene is detected by a rapid accelerator-off or a sudden braking and the re-acceleration performance improvement control unit 26 determines that the situation is not a re-acceleration improving scene after actuating a control to perform an improvement in the re-acceleration performance, the re-acceleration performance can be improved by determining a re-acceleration scene by a rapid accelerator-off or a sudden braking and prohibiting an engine stop by a re-acceleration control.

Next, a flowchart of the control when it is inferred whether or not the situation is a scene to improve the re-acceleration response in accordance with current information is illustrated.

Figure 5:
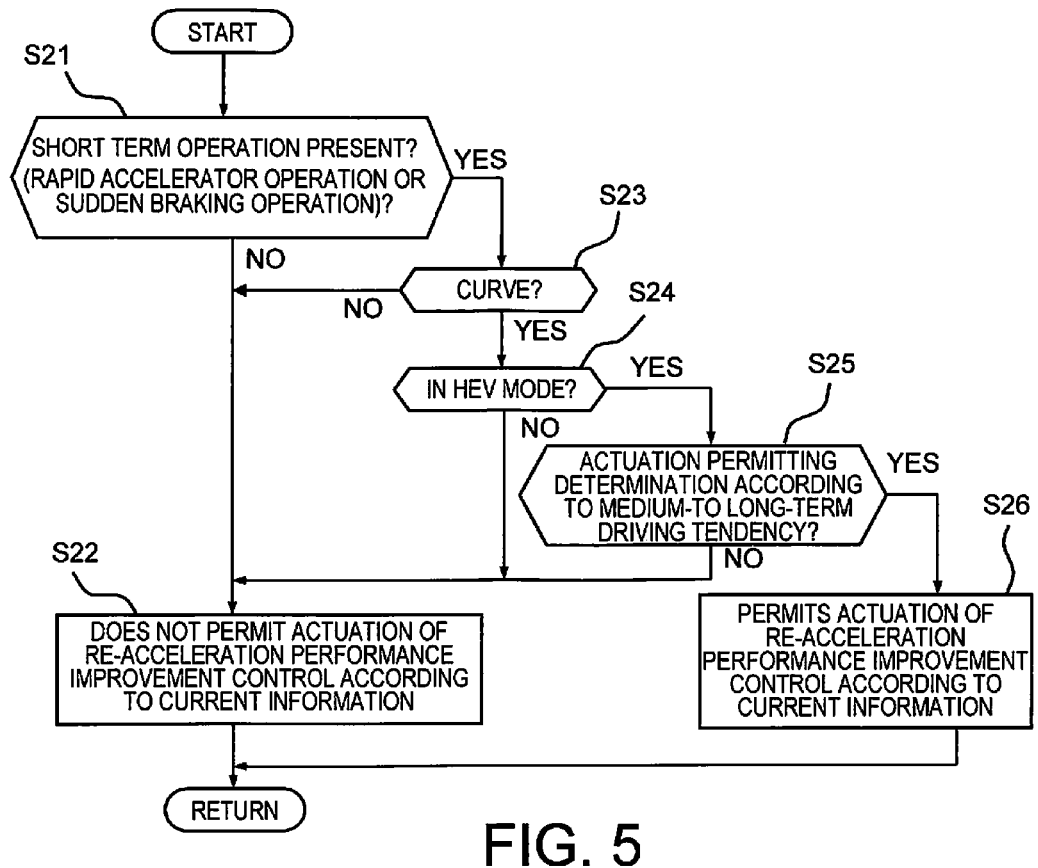
FIG. 5 is a flowchart used to predict the re-acceleration scene in the control according to the flowchart of FIG. 4.

In step S21 of FIG. 5, the re-acceleration performance improvement control unit 26 determines whether or not the situation is a scene which requires an improvement in the re-acceleration performance, based on current information. Here, examples of the current information include a rapid accelerator-off and a sudden braking operation. If the determination result is YES, the process proceeds to step S23, and if NO, the process proceeds to step S22.

In step S22, the actuation of a re-acceleration improvement control according to the current information is not permitted. Subsequently, the process returns to step S21.

On the other hand, a curve determination is carried out in step S23.

Here, curve detection is carried out as follows. That is, the re-acceleration performance improvement control unit 26 detects a curve based on, for example, the wheel speed of four wheels inputted from a wheel speed sensor, which is not shown, the steering angle inputted from a steering angle sensor, which is not shown, the vehicle lateral direction acceleration inputted from an acceleration sensor, which is not shown, and the vehicle speed inputted from a vehicle speed sensor, which is not shown. The detection of a curve can be carried out by other methods such as detecting whether or not there is a curve based on the yaw rate inputted from a yaw rate sensor, which is not shown, the longitudinal direction acceleration inputted from a longitudinal direction acceleration sensor, which is not shown, and the vehicle speed inputted from a vehicle speed sensor, which is not shown. As a result of the above calculations, if there is a curve determination, the process proceeds to step S24, and if there is no curve determination, the process proceeds to step S22.

In step S24, whether or not the current target mode is the HEV traveling mode is determined. If the determination result is YES, the process proceeds to step S25, and if NO, the process proceeds to step S22.

In step S25, a re-acceleration scene according to the medium- to long-term driving tendency is predicted and whether or not the actuation of a re-acceleration control is permitted is determined. If the determination result is YES, the process proceeds to step S26, and if NO, the process proceeds to step S22.

In step S26, the actuation of a re-acceleration response improvement control according to the current information is permitted. In this curve travel control, the transmission minimum rotational speed is calculated from the lateral acceleration or from the steering angle and the vehicle speed, using a map. Subsequently, the process returns to step S21.

In the above control, a curve is detected and a control for improving the re-acceleration response is carried out, but since this control is preferably not actuated with operations during lazy driving, actuation is configured to occur when a re-acceleration scene is predicted in step S25. In addition, since the engine must be running as one of the conditions added to the starting conditions of the above control (step S24), the starting of the engine 1 is prohibited even if a re-acceleration scene is predicted during an engine stop; the engine starting without a driver request or a system request is thereby prevented, and alarm is not imparted. Additionally, even if the engine being stopped is added as one of the starting conditions of the above control in this manner, when a re-acceleration scene is predicted, the engine 1 is running in most cases, so there is no problem.

Additionally, since the engine 1 running is a condition for actuating the above-described control, even if the engine 1 is started according to a system request after a curve detection, a control to improve the re-acceleration response by a curve detection will not be actuated. Additionally, since the actuation of the above control due to a curve detection during curve traveling is prevented, alarm is not imparted to the driver. Furthermore, even if the re-acceleration performance improvement control unit 26 determines that there is no re-acceleration scene after a curve has been detected and the control to improve the re-acceleration response has been actuated, the stopping of the engine 1 is prohibited by the control to carry out the re-acceleration response improvement according to a curve detection; therefore, the re-acceleration response can be improved.

In the conventional vehicle control device described above, there are cases in which the determination result of the switching between the EV traveling mode and the HEV traveling mode fluctuates due to the fluctuation of the inferred value of the sports degree, which causes a hunting of the engine between starting and stopping, creating a problem of imparting alarm and annoyance to the driver.

Figure 10:
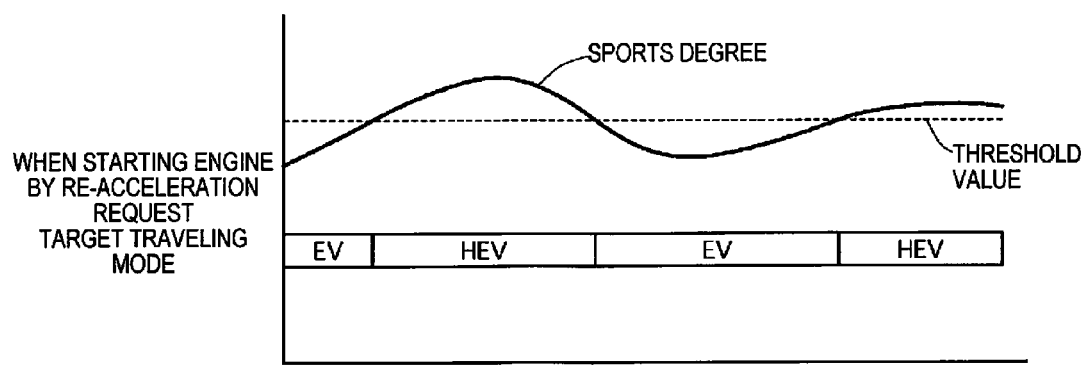
FIG. 10 is a view illustrating the occurrence of an engine start/stop hunting, caused by a fluctuation of the inferred value of sports traveling in the prior art.

That is, when the inferred value (represented by the solid line) of the sports degree fluctuates as illustrated in FIG. 10 to repeatedly surpass and fall below the traveling mode switching threshold (represented by the dotted line), hunting between the EV traveling mode and the HEV traveling mode occurs, causing a hunting of the engine 20 between start and stop. In this case as well, alarm and annoyance are imparted to the driver.

However, in the vehicle control device of the first embodiment, the determination to start the engine will not be carried out unless there is a driver request or a system request even if the sports degree fluctuates and moves up and down with respect to the threshold value; therefore, even if a hunting of the prediction of a re-acceleration scene by the re-acceleration performance improvement control unit 26 occurs, the generation of hunting of the engine 1 between starting and stopping can be suppressed.

As is clear from the above description, the vehicle control device of the first embodiment can achieve the following effects. That is, imparting alarm to the driver due to the engine 1 starting without a driver request or a system request can be suppressed, since the device is configured to prohibit the stopping of engine 1 while the engine 1 is running, and to carry out the starting of the engine 1 according to an accelerator-on based on the accelerator position opening amount while the engine 1 is stopped, when a re-acceleration scene of the engine is predicted.

In addition, the re-acceleration performance improvement control unit 26 has been configured so that a re-acceleration scene is predicted by calculating a value related to the driving situation by performing an integration step with acceleration/deceleration which acts on the vehicle including at least the acceleration/deceleration in the longitudinal direction of the vehicle, and physical quantities related thereto, and comparing this value related to the driving situation with a threshold value; therefore, when the acceleration exceeds the threshold value, the state is mainly the accelerator-on state, and during sports traveling the engine is often running, in which case the necessary driving force can be secured by prohibiting a stopping of the engine 1 according to the prediction of a re-acceleration scene. Additionally, if the deceleration or the lateral acceleration surpasses the threshold value, when the engine 1 is running, the engine 1 will not be started without a driver request or a system request; therefore, imparting alarm to the driver can be avoided.

In addition, the re-acceleration performance improvement control unit 26 has been configured so that a re-acceleration scene is predicted by calculating a value related to the traveling environment by, at least, detecting the road gradient and performing an integration step therewith, and comparing the value related to the traveling environment with a threshold value; therefore, the necessary driving force can be secured by prohibiting the stopping of the engine 1 according to the prediction of a re-acceleration scene, since, when maintaining or accelerating the vehicle speed on an uphill road, the required driving force is large and the engine is often running. On the other hand, when traveling a climbing gradient in the engine stop mode, since the vehicle is often decelerating, imparting alarm to the driver can be avoided by prohibiting the starting of the engine 1 unless there is a driver request or a system request.

In addition, the re-acceleration performance improvement control unit 26 has been configured so that the stopping of the engine is prohibited when a sudden braking or a rapid accelerator-off operation is detected and a re-acceleration scene is predicted and the running of the engine 1 is detected; therefore, the necessary driving force can be secured since the engine 1 will not be stopped when a sudden braking operation or a rapid accelerator-off is detected as well as when a re-acceleration scene is predicted. Additionally, the engine 1 is prevented from starting unless there is a driver request or a system request, to avoid imparting alarm to the driver. Additionally, even if the engine 1 starts by a system request after a rapid accelerator-off or a sudden braking operation, since the control to improve the re-acceleration response due to the sudden operations described above will not be actuated, imparting alarm to the driver can be prevented. Additionally, even if the situation is determined not to be a re-acceleration response improvement scene after a re-acceleration scene is detected and a control to improve the re-acceleration response is actuated due to the sudden operations described above, a re-acceleration scene is determined according to the sudden operations described above and the stopping of the engine 1 is prohibited by the control for improving the re-acceleration response, to improve the re-acceleration response.

Additionally, the re-acceleration performance improvement control unit 26 has been configured so that the stopping of the engine 1 is prohibited when a curve is detected, a re-acceleration scene is predicted, and the running of the engine 1 is detected; therefore, the engine 1 is prevented from starting during a curve, or unless there is a driver request or a system request, to prevent imparting alarm to the driver. Additionally, even if the engine 1 is started by a system request after detecting a curve, the actuation of the control for improving the re-acceleration response according to a curve detection can be prevented. Additionally, even if the situation is determined not to be a re-acceleration response improvement scene after a curve is detected and a control for improving the re-acceleration response is actuated, the stopping of the engine 1 is prohibited by the control for improving the re-acceleration response due to the detection of the curve, and the re-acceleration response can be improved.

Additionally, even if a hunting occurs in the prediction of a re-acceleration scene in the re-acceleration performance improvement control unit 26, since the starting of the engine 1 does not occur unless there is a driver request or a system request, the hunting of the engine 1 between starting and stopping, which imparts alarm to the driver, can be prevented.

The vehicle control device of the present invention was described above based on an embodiment configured as the above, but the present invention is not limited to the above embodiment, and design changes and modifications made without departing from the scope of the present invention are also included in the present invention.

Figure 6:
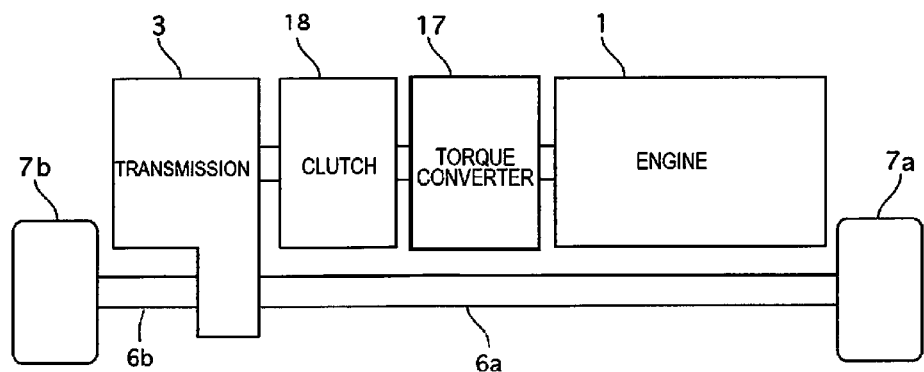
FIG. 6 is a view illustrating a configuration of an example other than the first embodiment of a power train equipped with a vehicle control device according to the present invention.
Figure 7:
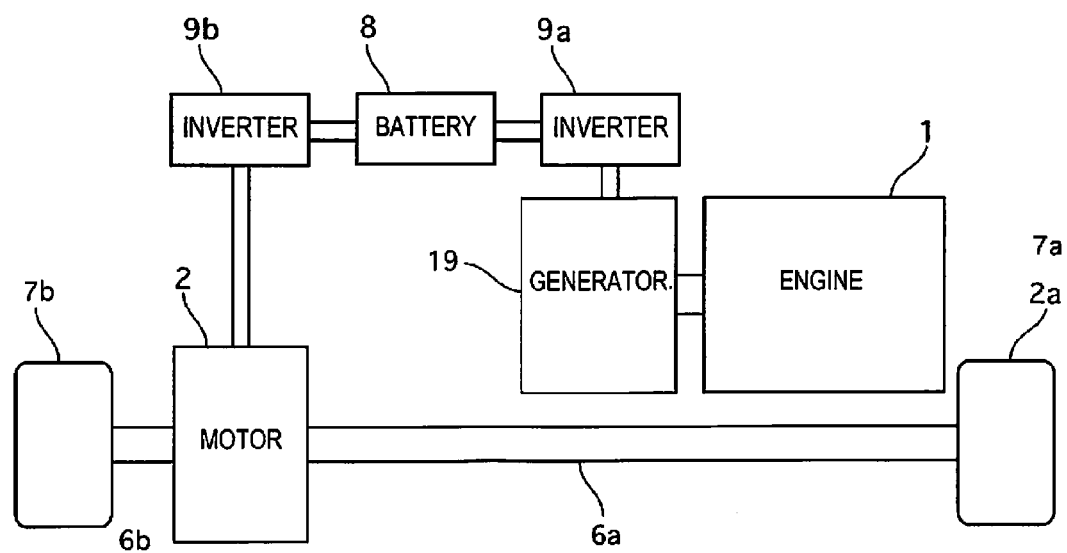
FIG. 7 is a view illustrating a configuration of yet another example of a power train equipped with a vehicle control device according to the present invention.
Figure 8:
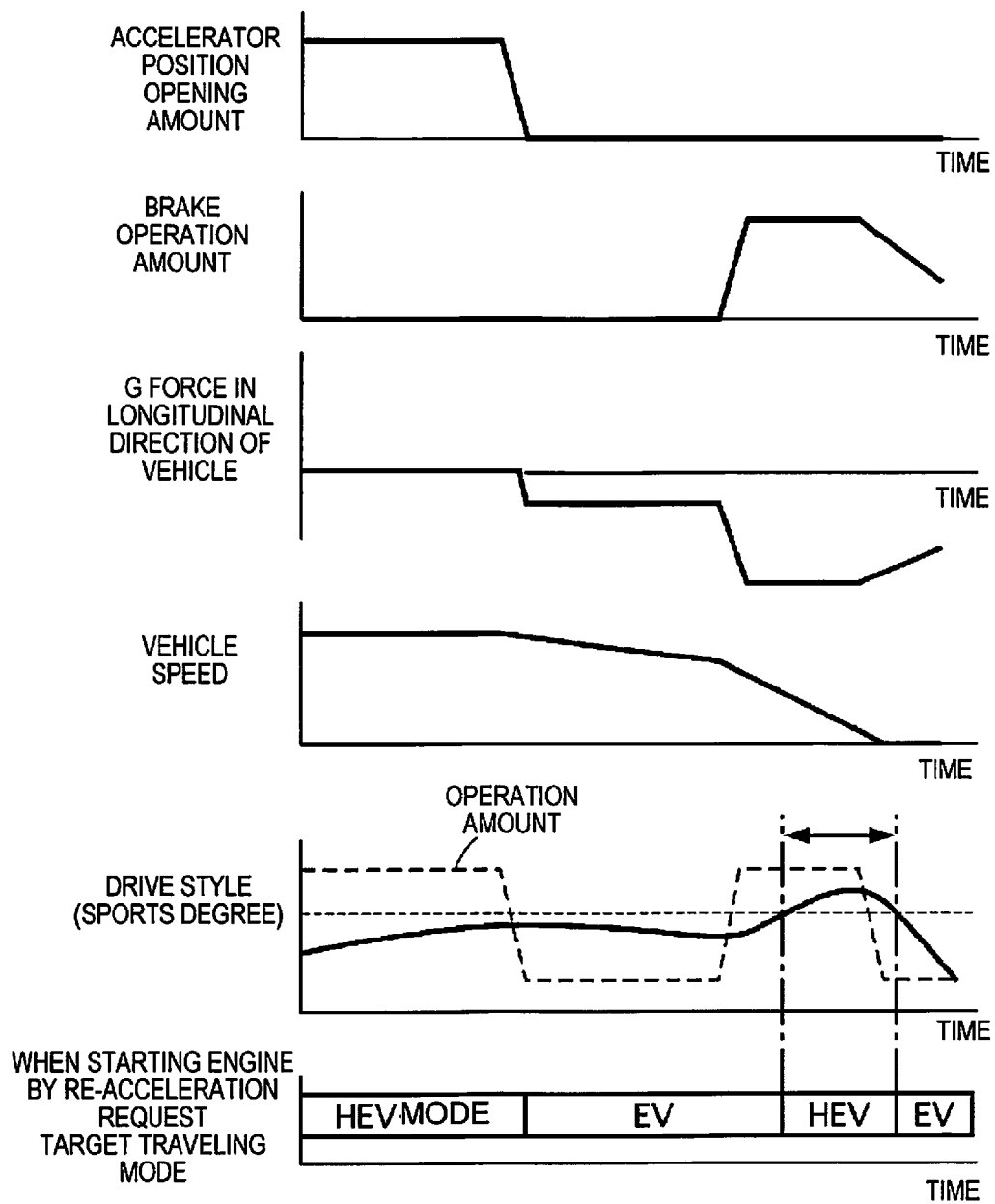
FIG. 8 is a view describing an example of problem which occurs when a sports traveling determination is performed based on the braking deceleration in the prior art.
Figure 9:
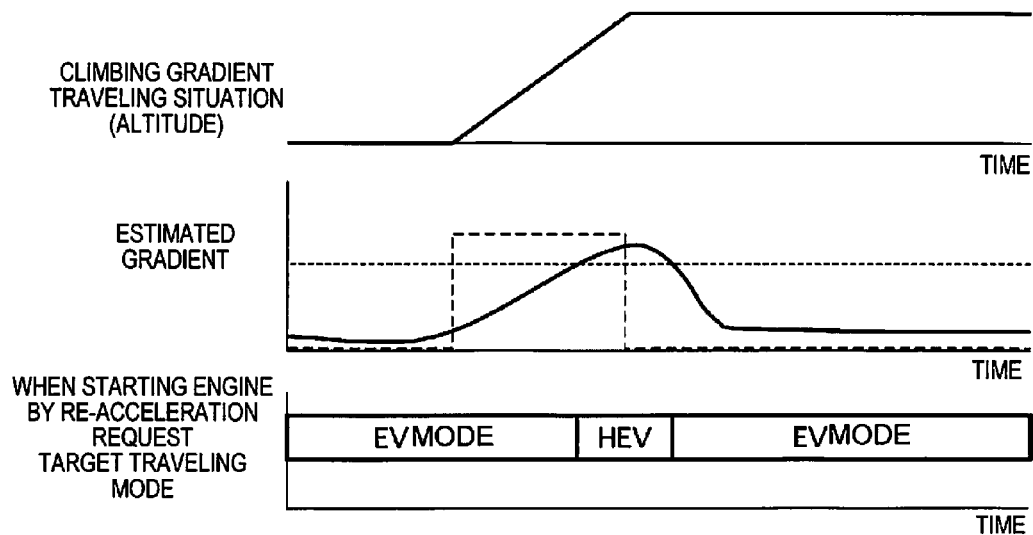
FIG. 9 is a view illustrating an example of the problem which occurs during hill-climbing in the prior art.

For example, the vehicle control device of the present invention can be applied to a vehicle equipped with a power train illustrated in FIG. 6 or FIG. 7 instead of the power train of the first embodiment, in which case the same effects as the first embodiment can be obtained. FIG. 6 is not of a hybrid vehicle, but a vehicle without a motor, driving the vehicle with only the engine 1, and which has a so-called coast-stop-sailing function, which controls the connection/release of a clutch 18 disposed between a torque converter 17, which is connected to the engine 1, and a transmission 4, in accordance with the accelerator position opening amount (release at accelerator position opening amount 0). Additionally, FIG. 7 is a vehicle configured so that: a generator 19 is connected to the engine 1; the electric power generated by the running of the engine 1 is converted to a DC current by an inverter 8a to charge a battery 9; while carrying out the supply of the electric power, which is converted to a three-phase alternating current by an inverter 8b, from the battery 9 to the motor (motor/generator) 2. Additionally, it is needless to say that the vehicle can be a plug-in hybrid vehicle.

The invention claimed is:

1. A vehicle control device comprising:
an engine which generates a driving force by burning of fuel;
an accelerator position opening amount sensor that detects an accelerator position opening amount corresponding to an operation amount of an accelerator pedal, which controls a fuel amount supplied to the engine;
an engine stop/start determination unit configured to determine stopping and starting of the engine based on a magnitude of the accelerator position opening amount detected by the accelerator position opening amount sensor;
an engine controller configured to either start or stop the engine in response to a determination of the engine stop/start determination unit; and
a re-acceleration scene predicting unit configured to predict a re-acceleration scene in which an accelerator-on state is performed after an accelerator-off state has been determined based on the accelerator position opening amount detected by the accelerator position opening amount sensor, and the re-acceleration scene predicting unit being further configured to predict the re-acceleration scene by calculating a value related to a traveling environment by a detected climbing gradient;
the engine controller being configured to
prohibit stopping the engine while the engine is running in a condition in which the re-acceleration scene predicting unit predicts an occurrence of the re-acceleration scene of the engine, and
prohibit starting the engine while the engine is stopped, and
carry out starting the engine according to the accelerator-on state based on the accelerator position opening amount detected by the accelerator position opening amount sensor in a condition in which the re-acceleration scene predicting unit predicts an occurrence of the re-acceleration scene of the engine to change the driving force in accordance with the road climbing gradient.

2. The vehicle control device according to claim 1, wherein
the re-acceleration scene predicting unit is further configured to predict a re-acceleration scene by calculating a value related to a driving situation by performing an integration step with acceleration/deceleration which acts on the vehicle including at least acceleration/deceleration in a longitudinal direction of a vehicle and comparing the value related to the driving situation with a threshold value.

3. The vehicle control device according to claim 1, wherein
the re-acceleration scene predicting unit is further configured to predict a re-acceleration scene by performing an integration step with the value related to the traveling environment, and comparing the value related to the traveling environment with a threshold value.

4. The vehicle control device according to claim 1, further comprising
a brake sensor for detecting a braking operation amount, and
the engine stop/start determination unit being further configured to prohibit the stopping of the engine, when detecting a sudden braking operation based on a braking operation amount detected by the brake sensor or a rapid accelerator-off operation based on the accelerator position opening amount detected by the accelerator position opening amount sensor, and the re-acceleration scene predicting unit being configured to predict a re-acceleration scene, and when running of the engine is detected.

5. The vehicle control device according to claim 1, further comprising
a curve detection unit configured to detect a curve based on at least one of a lateral acceleration, a steering angle and a vehicle speed, and the engine stop/start determination unit being further configured to prohibit the stopping of the engine when the curve detection unit detects a curve, the re-acceleration scene predicting unit predicts a re-acceleration scene, and when the running of the engine is detected.

* * * * *